(12) United States Patent
Colrain (10) Patent No.: US 7,747,717 B2
(45) Date of Patent: Jun. 29, 2010

(54) FAST APPLICATION NOTIFICATION IN A CLUSTERED COMPUTING SYSTEM

(75) Inventor: Carol Colrain, Redwood Shores, CA (US)

(73) Assignee: Oracle International Corporation, Redwood Shores, CA (US)

(*) Notice: Subject to any disclaimer, the term of this patent is extended or adjusted under 35 U.S.C. 154(b) by 1062 days.

(21) Appl. No.: 10/917,660

(22) Filed: Aug. 12, 2004

(65) Prior Publication Data

US 2005/0038772 A1 Feb. 17, 2005

Related U.S. Application Data

(60) Provisional application No. 60/500,096, filed on Sep. 3, 2003, provisional application No. 60/495,368, filed on Aug. 14, 2003.

(51) Int. Cl.
*G06F 15/173* (2006.01)
*G06F 15/16* (2006.01)
*G06F 13/00* (2006.01)
*G06F 13/28* (2006.01)

(52) U.S. Cl. .................. 709/223; 709/204; 711/141; 714/50

(58) Field of Classification Search .............. None
See application file for complete search history.

(56) References Cited

U.S. PATENT DOCUMENTS

| 5,600,791 | A | * | 2/1997 | Carlson et al. ............. 714/47 |
| 5,721,825 | A | | 2/1998 | Lawson et al. |
| 5,890,167 | A | | 3/1999 | Bridge, Jr. et al. |
| 5,933,604 | A | | 8/1999 | Inakoshi |
| 6,088,727 | A | * | 7/2000 | Hosokawa et al. .......... 709/223 |
| 6,088,728 | A | | 7/2000 | Bellemore et al. |

(Continued)

FOREIGN PATENT DOCUMENTS

EP 0 750 256 A2 6/1996

(Continued)

OTHER PUBLICATIONS

Ravi Kokku et al., "Half-pipe Anchoring: An Efficient Technique for Multiple Connection Handoff," Proceedings 10th International Conference on Network Protocols, Nov. 12, 2002, XP010632563, 10 pages.

(Continued)

*Primary Examiner*—Moustafa M Meky
*Assistant Examiner*—Ho Shiu
(74) *Attorney, Agent, or Firm*—Hickman Palermo Truong & Becker LLP; Deborah L. Caswell (57) ABSTRACT

With fast notification of changes to a clustered computing system, through which a number of events are published for system state changes, applications can quickly recover and sessions can quickly be rebalanced. When a resource associated with a service experiences a change in status, such as a termination or a start/restart, a notification event is immediately published. Notification events contain information to enable subscribers to identify, based on matching a session signature, the particular sessions that are affected by the change in status, and to respond accordingly. This allows sessions to be quickly aborted and ongoing processing to be quickly terminated when a resource fails, and allows fast rebalancing of work when a resource is restarted.

48 Claims, 3 Drawing Sheets

U.S. PATENT DOCUMENTS

| | | | |
|---|---|---|---|
| 6,105,067 A | 8/2000 | Batra | |
| 6,192,401 B1* | 2/2001 | Modiri et al. | 709/220 |
| 6,243,751 B1 | 6/2001 | Chatterjee et al. | |
| 6,279,001 B1* | 8/2001 | DeBettencourt et al. | 707/10 |
| 6,321,235 B1 | 11/2001 | Bird | |
| 6,353,898 B1* | 3/2002 | Wipfel et al. | 714/48 |
| 6,415,333 B1* | 7/2002 | Vasell | 719/315 |
| 6,438,705 B1 | 8/2002 | Chao et al. | |
| 6,466,949 B2* | 10/2002 | Yang et al. | 707/201 |
| 6,594,786 B1* | 7/2003 | Connelly et al. | 714/50 |
| 6,718,394 B2* | 4/2004 | Cain | 709/242 |
| 6,801,949 B1* | 10/2004 | Bruck et al. | 709/232 |
| 6,950,848 B1 | 9/2005 | Yousefi'zadeh | |
| 6,952,766 B2* | 10/2005 | Dervin et al. | 713/2 |
| 6,990,606 B2* | 1/2006 | Schroiff et al. | 714/7 |
| 7,039,654 B1 | 5/2006 | Eder | |
| 7,082,117 B2* | 7/2006 | Billhartz | 370/338 |
| 7,093,250 B1* | 8/2006 | Rector | 718/100 |
| 7,136,825 B2 | 11/2006 | Araki et al. | |
| 7,174,379 B2 | 2/2007 | Agarwal et al. | |
| 7,177,823 B2* | 2/2007 | Lam et al. | 705/10 |
| 7,272,688 B1* | 9/2007 | Glasco | 711/141 |
| 7,293,255 B2* | 11/2007 | Kumar | 717/109 |
| 7,296,268 B2* | 11/2007 | Darling et al. | 718/105 |
| 7,299,294 B1* | 11/2007 | Bruck et al. | 709/235 |
| 7,346,744 B1* | 3/2008 | Glasco | 711/141 |
| 7,370,223 B2 | 5/2008 | Olmstead et al. | 714/4 |
| 7,392,421 B1* | 6/2008 | Bloomstein et al. | 714/4 |
| 7,447,693 B2* | 11/2008 | Wilding et al. | 707/100 |
| 7,506,034 B2 | 3/2009 | Coates et al. | |
| 7,512,686 B2 | 3/2009 | Berg | |
| 2001/0027406 A1 | 10/2001 | Araki et al. | |
| 2002/0055982 A1 | 5/2002 | Goddard | |
| 2002/0073139 A1 | 6/2002 | Hawkins et al. | |
| 2002/0073354 A1* | 6/2002 | Schroiff et al. | 714/4 |
| 2002/0078263 A1* | 6/2002 | Darling et al. | 709/331 |
| 2002/0099598 A1 | 7/2002 | Eicher et al. | |
| 2002/0129146 A1* | 9/2002 | Aronoff et al. | 709/225 |
| 2002/0198883 A1* | 12/2002 | Nishizawa et al. | 707/10 |
| 2003/0037146 A1 | 2/2003 | O'Neill | |
| 2003/0065986 A1 | 4/2003 | Fraenkel et al. | |
| 2003/0088425 A1* | 5/2003 | Lam et al. | 705/1 |
| 2003/0126240 A1* | 7/2003 | Vosseler | 709/221 |
| 2003/0154398 A1* | 8/2003 | Eaton et al. | 713/201 |
| 2003/0158951 A1* | 8/2003 | Primak et al. | 709/229 |
| 2003/0172145 A1 | 9/2003 | Nguyen | |
| 2003/0204509 A1* | 10/2003 | Dinker et al. | 707/100 |
| 2003/0208523 A1 | 11/2003 | Gopalan et al. | |
| 2003/0229695 A1 | 12/2003 | McBride | |
| 2004/0024881 A1* | 2/2004 | Elving et al. | 709/227 |
| 2004/0078455 A1* | 4/2004 | Eide et al. | 709/223 |
| 2004/0098490 A1 | 5/2004 | Dinker et al. | |
| 2004/0117375 A1 | 6/2004 | Saha et al. | |
| 2004/0153708 A1* | 8/2004 | Joshi et al. | 714/4 |
| 2004/0176996 A1 | 9/2004 | Powers et al. | |
| 2004/0205101 A1 | 10/2004 | Radhakrishnan | |
| 2004/0243699 A1 | 12/2004 | Koclanes et al. | |
| 2004/0257985 A1 | 12/2004 | Sahai et al. | |
| 2005/0050116 A1 | 3/2005 | Gross et al. | |
| 2006/0195525 A1* | 8/2006 | Page et al. | 709/206 |
| 2008/0027769 A1 | 1/2008 | Eder | |
| 2008/0228923 A1 | 9/2008 | Chidambaran et al. | |

FOREIGN PATENT DOCUMENTS

| | | |
|---|---|---|
| EP | 0 992 909 A2 | 4/2000 |
| EP | 1 260 902 A2 | 5/2002 |
| WO | WO 02/05116 A2 | 1/2002 |
| WO | WO 02/097676 A2 | 12/2002 |

OTHER PUBLICATIONS

Ying-Dar Lin et al., "Direct Web Switch Routing with State Migration, TCP Masquerade, and Cookie Name Rewriting," Globecom 2003, IEEE Global Telecommunications Conference, Dec. 1, 2003, IEEE, CP010677300, pp. 3663-3667.

International Searching Authority, "Notification of Transmittal of the International Search Report and the Written Opinion of the International Searching Authority, or the Declaration," Nov. 12, 2004, 13 pages.

Current Claims of International Application No. PCT/US2004/026570, 4 pages.

Current Claims of International Application No. PCT/US2004/025805, 8 pages.

International Searching Authority, "Notification of Transmittal of the International Search Report and the Written Opinion of the International Searching Authority, or the Declaration," dated Dec. 3, 2004, 12 pages.

International Preliminary Examining Authority, "Written Opinion of the International Preliminary Examining Authority," Jun. 7, 2005, 4 pages.

Current Claims of International Application No. PCT/US04/26570, 4 pages.

European Patent Office, "International Preliminary Report on Patentability," Aug. 26, 2005, International Application No. PCT/US2004/026570, 9 pages.

International Searching Authority, "Notification of the Transmittal of the International Search Report and Written Opinion of the International Searching Authority, or the Declaration," PCT/US2004/026506, dated Sep. 8, 2005, 12 pages.

Current Claims, PCT/US2004/026506, 9 pages.

* cited by examiner

FIG. 1

EXTERNAL EVENT SYSTEM

RESOURCES

| SERVICES | DATABASES | INSTANCES |

HIGH AVAILABILITY FRAMEWORK

INTERNAL EVENT SYSTEM

CLUSTER SERVICE NODE MEMBERSHIP

FAST APPLICATION NOTIFICATION IN A CLUSTERED COMPUTING SYSTEM

CROSS REFERENCE TO RELATED APPLICATIONS

This application claims the benefit of priority to U.S. Provisional Patent Application No. 60/500,096 filed on Sep. 3, 2003, entitled "Service Based Workload Management and Measurement In a Distributed System"; and claims the benefit of priority to U.S. Provisional Patent Application No. 60/495,368 filed on Aug. 14, 2003, entitled "Computer Resource Provisioning"; and is related to U.S. patent application Ser. No. 10/917,663 filed on Aug. 12, 2004, entitled "Fast Reorganization of Connections in Response to an Event in a Clustered Computing System"; and is related to U.S. patent application Ser. No. 10/917,715 filed on Aug. 12, 2004, entitled "Measuring Workload By Service"; the contents of all of which are incorporated by this reference in their entirety for all purposes as if fully set forth herein.

FIELD OF THE INVENTION

The present invention relates generally to clustered computing systems and, more specifically, to techniques for fast notification of a change in state in a clustered system, using events.

BACKGROUND OF THE INVENTION

Clustered Computing System

A clustered computing system is a collection of interconnected computing elements that provide processing to a set of client applications. Each of the computing elements is referred to as a node. A node may be a computer interconnected to other computers, or a server blade interconnected to other server blades in a grid. A group of nodes in a clustered computing system that have shared access to storage (e.g., have shared disk access to a set of disk drives or non-volatile storage) and that are connected via interconnects is referred to herein as a work cluster.

A clustered computing system is used to host clustered servers. A server is combination of integrated software components and an allocation of computational resources, such as memory, a node, and processes on the node for executing the integrated software components on a processor, where the combination of the software and computational resources are dedicated to providing a particular type of function on behalf of clients of the server. An example of a server is a database server. Among other functions of database management, a database server governs and facilitates access to a particular database, processing requests by clients to access the database.

Resources from multiple nodes in a clustered computing system can be allocated to running a server's software. Each allocation of the resources of a particular node for the server is referred to herein as a "server instance" or instance. A database server can be clustered, where the server instances may be collectively referred to as a cluster. Each instance of a database server facilitates access to the same database, in which the integrity of the data is managed by a global lock manager.

Services for Managing Applications According to Service Levels

Services are a feature for database workload management that divide the universe of work executing in the database, to manage work according to service levels. Resources are allocated to a service according to service levels and priority. Services are measured and managed to efficiently deliver the resource capacity on demand. Source high availability service levels use the reliability of redundant parts of the cluster.

Services are a logical abstraction for managing workloads. Services can be used to divide work executing in a database cluster into mutually disjoint classes. Each service can represent a logical business function, e.g., a workload, with common attributes, service level thresholds, and priorities. The grouping of services is based on attributes of the work that might include the application function to be invoked, the priority of execution for the application function, the job class to be managed, or the data range used in the application function of a job class. For example, an electronic-business suite may define a service for each responsibility, such as general ledger, accounts receivable, order entry, and so on. Services provide a single system image to manage competing applications, and the services allow each workload to be managed in isolation and as a unit. A service can span multiple server instances in a cluster or multiple clusters in a grid, and a single server instance can support multiple services.

Middle tier and client/server applications can use a service by, for example, by specifying the service as part of the connection. For example, application server data sources can be set to route to a service. In addition, server-side work sets the service name as part of the workload definition. For example, the service that a job class uses is defined when the job class is created, and during execution, jobs are assigned to job classes and job classes run within services.

Database Sessions

In order for a client to interact with a database server on a database cluster, a session is established for the client. A session, such as a database session, is a particular connection established for a client to a server, such as a database instance, through which the client issues a series of requests (e.g., requests for execution of database statements). For each database session established on a database instance, session state data is maintained that reflects the current state of a database session. Such information contains, for example, the identity of the client for which the session is established, the service used by the client, and temporary variable values generated by processes executing software within the database session. An application may "borrow" a connection from a connection pool and put the connection back into the pool when the session is ended. Generally, a session is a vehicle to perform work with a database. Each session may each have its own database process or may share database processes, with the latter referred to as multiplexing.

High Availability

Certain changes occur within clustered computing systems which reduce high availability and cause client applications to waste time. Such changes can be generally classified as either a "down" change, an "up" change, or a "not restarting"

change. A down change occurs when a service, a server instance, or a node machine (generally, a "component") terminates, or "goes down." An up change occurs when a service, a server instance, or a node initializes, or "comes up." A "not restarting" change occurs when a service, instance or node can no longer start. Some changes may affect the existing sessions, as well as connections that are not currently in use but that are already created and associated with a service, instance or node.

Applications waste significant amounts of time and resources in their interactions with a clustered system, via a session, when the state of the clustered system changes. In particular, client applications of a clustered database waste time and resources when the state of the clustered system changes. For example, when a node or a server instance that the session is using "goes down," the application may not be interrupted for a long period of time. Specifically, if the node or network fails to close the session sockets, the application waits for a TCP/IP timeout error from the local TCP/IP stack. For another example, work may not be distributed across all instances supporting a service when a new service, node or instance becomes available, i.e., "comes up." In other words, time is wasted by not connecting with a service, node or instance when it becomes available. One other way in which time and resources are wasted is when clients keep retrying to communicate with a component that will not be coming back up, or has not restarted.

In general, traditional systems perform very poorly when a node goes down. Application sessions can wait up to two hours to be interrupted. In general, traditional systems function poorly in allocating work to a restored entity when a failed system entity is restored (i.e., an entity that has come up). Thus, traditional systems provide reduced availability, and potentially reduced service times, from what such a system could provide. Furthermore with traditional systems, following repair or restore of a failed component, traditional cold-failover systems typically offer fallback of the entire workload to the restored entity, rather than offering load balancing across the complement of components in the cluster.

During runtime, sessions typically are in one of four states in relation to respective database server instances. A session may be (1) actively connecting to an instance, i.e., establishing a session with the instance; (2) actively issuing a command to the instance, such as issuing SQL statements; (3) passively blocked, waiting for a response to issued SQL statements; and (4) processing a previous request, e.g., a SQL statement. State (1) is distinct from the other states because the client is entering the TCP/IP stack. In the other states, the client is inside the TCP/IP stack.

Clients of servers waste significant amounts of time and resources in their interactions with a clustered system, via a session, when the state of the clustered system changes. In particular, client applications of a clustered database waste time and resources when the state of the database cluster changes. For example, work may not be distributed across all instances supporting a service when a new service, node or instance becomes available, i.e., "comes up." In other words, time is wasted by not connecting with a node or instance when a service on the node or instance becomes available. One other way in which time and resources are wasted is when clients keep retrying to communicate with a component that will not be coming back up (i.e., communicating with a dead node) or has not restarted. For example, when a node or a server instance that the session is using "goes down," the application may not be interrupted for a long period of time (e.g., two hours is typical). Specifically, if the node or network fails to close the session sockets, the application waits for a TCP/IP timeout error from the local TCP/IP stack.

Scenario (1) can be alleviated by using a virtual IP address that is always available. This is because the client is outside the TCP/IP stack. Thus, when a node goes down the IP address fails over to a different node. However, when the node comes back up, there is no similar solution to address the change in system state. In general, the vast majority of problems occur when a session is in states (2), (3) or (4). The vast majority of wasted time occurs when an application and/or session must wait for resolution of problems when the session is in state (3). Even worse, applications are in state (3) approximately 90% of the time. In addition, with connection pool clients, time is wasted by providing dead connections to applications.

In general, traditional systems function poorly in allocating work to a restored entity when a failed or otherwise terminated system entity is restored. Thus, traditional systems provide reduced availability, and potentially reduced service times, from what such a system could provide. Furthermore with traditional systems, following repair or restore of a failed component, traditional cold-failover systems typically offer fallback of the entire workload to the restored entity, rather than offering load balancing across the complement of components in the cluster. Furthermore, when there is only one node configured for cold-failover, standby, and the like, there is no redundancy in the system. Such a system is referred to as an "active/passive" system, in which all resources are available to all the connected applications.

Based on the foregoing, there is room for improvement in reacting to system state changes in a clustered computing system.

BRIEF DESCRIPTION OF THE DRAWINGS

Embodiments of the present invention are depicted by way of example, and not by way of limitation, in the figures of the accompanying drawings and in which like reference numerals refer to similar elements and in which.

DETAILED DESCRIPTION OF EMBODIMENTS OF THE INVENTION

Functional Overview of Embodiments

Techniques for fast notification of changes to a clustered computing system are described, in which a number of events are published for system state changes, for enabling fast application recovery and fast rebalancing of sessions with the clustered system. One example of such a clustered computing system is a database cluster comprising multiple instances of a database server executing on multiple node machines, configured to access and manipulate shared data from a database in response to requests from multiple client applications.

When a resource associated with a service experiences a change in status, a notification event is immediately published for use by various subscribers to the event. For example, a notification event is issued whenever a service becomes available on an instance and whenever a service becomes unavailable on an instance. The notification events occur for status changes for services and for the resources that support the services, such as a particular instance, an instance, a node or a database cluster. When a service offered by one or more instances starts, a notification event (UP) is issued that may be used to start applications that are dependent on the service. When the service offered by one or more instances terminates, and also when an instance or node terminates, a notification event (DOWN) is issued to halt the dependent applications. When managing clusterware can no longer manage the service because the service has exceeded its failure threshold, a notification event (NOT_RESTARTING) is issued to interrupt applications retrying the service. In one embodiment, the NOT_RESTARTING event initiates switching to a disaster service.

Upon connecting to the cluster, a unique signature (i.e., a locator) is generated for an associated session and recorded on a handle as part of the connection. In an embodiment, the signature comprises a service identifier, a node identifier, and database unique name, and an instance identifier, each of which is associated with the session. In the context of a database cluster, notification events contain information to enable subscribers to identify the particular sessions that are affected by the change in status, i.e., the signatures of the affected sessions. For some types of events, information used to identify affected sessions includes identification of the service and the database associated with the status change. For other types of events, the information used to identify affected sessions additionally includes identification of the instance and node associated with the status change. The affected sessions are the sessions with signatures that match the signature included in the event payload.

Consequently, applications and sessions are quickly notified when a relevant resource changes state. With use of these techniques, notification events can be used to overcome the problems with traditional systems, previously described herein.

Operating Environment

Figure 1:
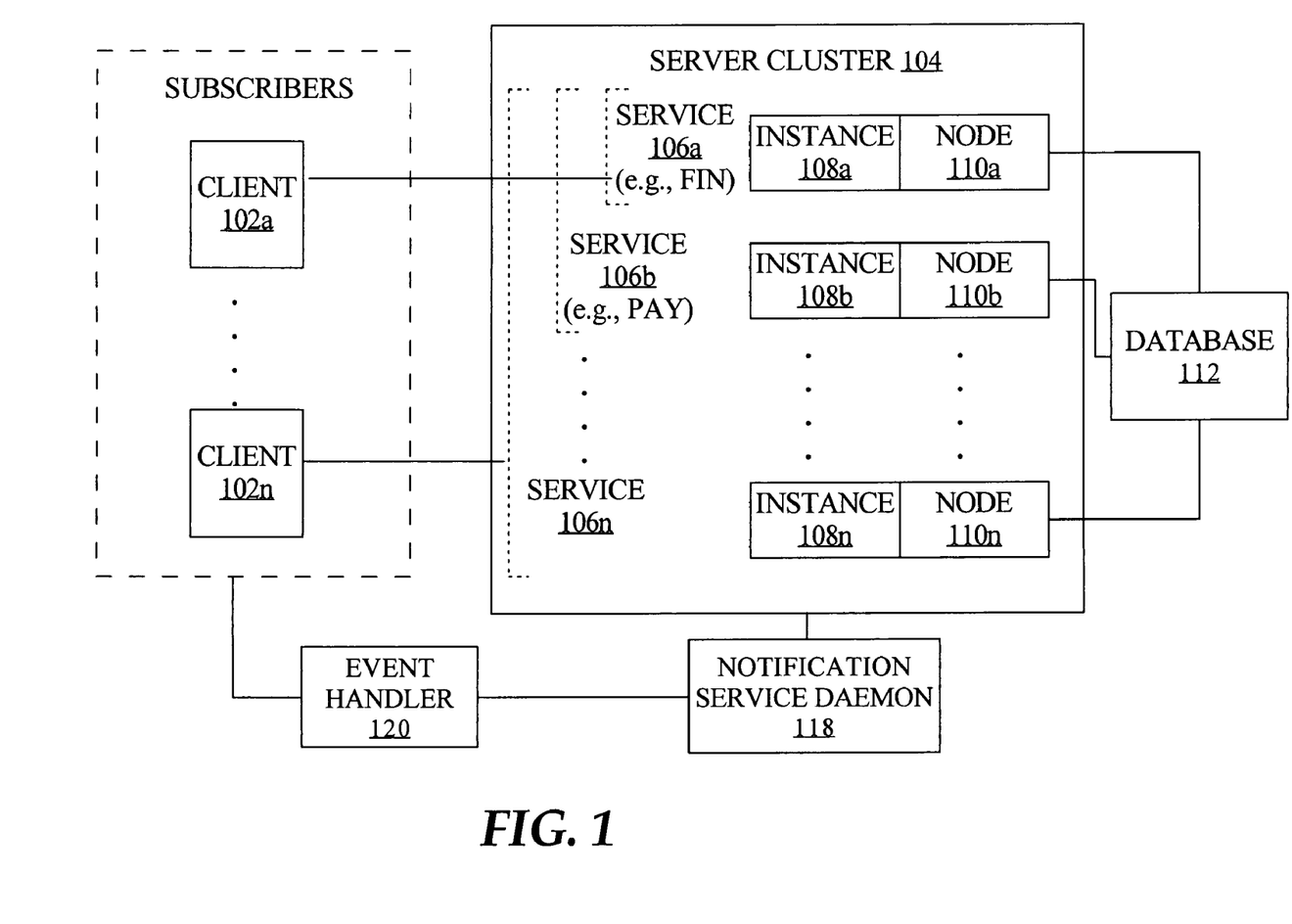
FIG. 1 is a block diagram that illustrates an operating environment in which an embodiment can be implemented.

FIG. 1 is a block diagram that illustrates an operating environment in which an embodiment can be implemented. Use of element identifiers ranging from a to n, for example, clients 102a-102n, services 106a-106n, instances 108a-108n, and nodes 110a-110n, does not mean that the same number of such components are required. In other words, n is not necessarily equal for the respective components. Rather, such identifiers are used in a general sense for in reference to multiple similar components.

Clustered Computing Environment

One or more clients 102a-102n are communicatively coupled to a server cluster 104 ("server") that is connected to a shared database 112. Server 104 refers collectively to a cluster of server instances 108a-108n and nodes 110a-110n on which the instances execute. Other components may also be considered as part of the server 104, such as a notification service daemon 118 and an event handler 120. However, the actual architecture in which the foregoing components are configured may vary from implementation to implementation. Clients 102a-102n may be applications executed by computers interconnected to an application server or some other middleware component between clients and server 104 via, for example, a network. In addition, one server instance may be a client of another server instance. Any or all of clients 102a-102n may operate as subscribers of published events, as described herein.

In the context of a database cluster, database 112 comprises data and metadata that is stored on a persistent memory mechanism, such as a set of hard disks that are communicatively coupled to nodes 110a-110n, each of which is able to host one or more instances 108a-108n, each of which hosts at least a portion of one or more services. Such data and metadata may be stored in database 112 logically, for example, according to relational database constructs, multidimensional database constructs, or a combination of relational and multidimensional database constructs. Nodes 110a-110n can be implemented as a conventional computer system, such as computer system 300 illustrated in FIG. 3.

As described, a database server is a combination of integrated software components and an allocation of computational resources (such as memory and processes) for executing the integrated software components on a processor, where the combination of the software and computational resources are used to manage a particular database, such as database 112. Among other functions of database management, a database server typically facilitates access to database 112 by processing requests from clients to access the database 112. Instances 108a-108n, in conjunction with respective nodes 110a-110n, host services 106a-106n.

Services 106

As previously described herein, services are, generally, a logical abstraction for managing workloads. More specific to the context of embodiments of the invention, a service, such as service 106a-106n, has a name and a domain, and may have associated goals, service levels, priority, and high availability attributes. The work performed as part of a service includes any use or expenditure of computer resources, including, for example, CPU processing time, storing and accessing data in volatile memory, read and writes from and/or to persistent storage (i.e. disk space), and use of network or bus bandwidth.

In one embodiment, a service is work that is performed by a database server during a session, and typically includes the work performed to process and/or compute queries that require access to a particular database. The term query as used herein refers to a statement that conforms to a database language, such as SQL, and includes statements that specify operations to add, delete, or modify data and create and modify database objects, such as tables, objects views, and executable routines. A system, including a clustered computing system, may support many services.

Services can be provided by one or more database server instances. Thus, multiple server instances may work together to provide a service to a client. In FIG. 1, service 106a (e.g., FIN) is depicted, with dashed brackets, as being provided by instance 108a, service 106b (e.g., PAY) is depicted as being provided by instances 108a and 108b, and service 106n is depicted as being provided by instances 108a-108n.

Generally, the techniques described herein are as service-centric, where events occurring within server 104 can be identified and/or characterized based on the service(s) which is affected by the event. The payload of notification events is described hereafter.

Notification System

In general, a daemon is a process that runs in the background and that performs a specified operation at predefined times or in response to certain events. In general, an event is an action or occurrence whose posting is detected by a process. Notification service daemon 118 is a process that receives system state change information from server 104, such as from clusterware that is configured to manage the cluster of instances 106a-106n. Such state change information may include, for example, service, instance and node up or down event information. The server 104 posts events when conditions change within the cluster, as described herein.

Notification service daemon 118 has a publisher-subscriber relationship with event handler 120 through which system state change information that is received by daemon 118 from server 104 is transmitted as notification events to event handler 120. In general, an event handler is a function or method containing program statements that are executed in response to an event. In response to receiving event information from daemon 118, event handler 120 at least passes along the event type and attributes, which are described herein. A single event handler 120 is depicted in FIG. 1 as serving all subscribers. However, different event handlers may be associated with different subscribers. The manner in which handling of notification events is implemented by various subscribers to such events is unimportant, and may vary from implementation to implementation.

Transmission of event information from server 104 to notification service daemon 118, and from notification service daemon 118 to event handler 120, is "out-of-band". In this context, out-of-band means that such transmission is not through the session communication path because that path may be blocked due to the event. For example, the out-of-band notifications may be issued asynchronously through gateway processes that are not part of the clusterware that manages the cluster. For a non-limiting example, notification service daemon 118 may use the Oracle Notification System (ONS) API, which is a messaging mechanism that allows application components based on the Java 2 Platform, Enterprise Edition (J2EE) to create, send, receive, and read messages.

"Subscribers" represents various entities that may subscribe to and respond to notification events for various respective purposes. Non-limiting examples of subscribers include clients 102a-102n, connection pool managers, mid-tier applications, batch jobs, callouts, paging and alert mechanisms, high availability logs, and the like.

Notification Events

When the state of a given service changes, i.e., when the state of a cluster resource that participates in performing the work of the given service changes, the new state is notified to interested subscribers through notification events. Applications can use this notification, for example, to achieve very fast detection of failures in order to stop processing previous results, to clean up connection pool sessions, and for balancing of connection pools following failures and when the failed components are repaired. For example, when the service starts at an instance, the events may be used to immediately trigger work executing on the instance. When the service terminates at an instance, the event may be used to interrupt applications using the service at that instance.

Use of notification events by various client subscribers eliminates, for example, the client waiting for TCP timeouts or wasted processing of the last result at the client after a failure and before being interrupted. Without such notifications, if a node fails without closing sockets, any sessions that are blocked in I/O wait (read or write) could wait minutes to hours for a timeout, and sessions processing last results would not receive an interrupt until the next data is requested.

Notification Event Payload

In an embodiment, notification events include identification of an event type and event properties. Table 1 describes parameters associated with notification events, according to an embodiment of the invention.

TABLE 1

| Parameter | Description |
| --- | --- |
| Event type | The event type for the cluster component: service, service_member, database, instance, node. |
| Service name | The service name. |
| Database name | The unique database supporting the service. |
| Instance | The name of the instance supporting the service. |
| Node name | The node name supporting the service or the node that has gone down. |
| Status | The new status: UP, DOWN, NOT_RESTARTING. |
| Incarnation | Date and time stamp; can be used to order notification events. |
| Cardinality | The number of instances supporting the service. |
| Reason | The reason for the system change: planned or unplanned. |

A "service" event type is triggered when an entire service goes down, i.e., when the service goes down on every instance supporting the service. A "service_member" event type is triggered when a service goes down on a particular instance. A "database" event type is triggered when the entire database goes down, i.e., every instance managing the database goes down. A "node" event type is triggered when a node machine goes down and, consequently, the instances running on that node are unavailable to support any services. The "node name" is the name of the node as known by the managing clusterware. DOWN events are often followed by UP events, such as when service members failover to another instance upon a failure of a supporting instance and when failed components are repaired.

It is not necessary that event payloads for each event type contain each of the event properties. Table 2 denotes the properties that are included in event payloads for each event type, according to an embodiment of the invention.

TABLE 2

| Event Type | Service Name | Database Name | Instance Name | Node name | Status | Time stamp | Cardinality |
| --- | --- | --- | --- | --- | --- | --- | --- |
| Service | x | x | | | x | x | |
| Service member | x | x | x | x | x | x | x |
| Database | x | x | | | x | x | x |
| Instance | x | x | x | x | x | x | |
| Node | | | | x | x | x | |

According to embodiments, events may be published to the notification system described herein (which provides a programmatic interface to events), to server-side callouts, and to call interface callbacks.

Some examples of system state change scenarios follow.

When an instance fails, several notification events are published: (1) one with an event type=instance, to notify that the instance is down; (2) one for each service that was running on the terminated instance, with event type=service_member, to notify that the service is down on that particular instance. In addition, if a service restarts on another supporting instance (i.e., an instance available as a backup instance to support a service), an event is published with an event type=service_member, to notify that the service is newly available on a particular instance. If and when the terminated instance is repaired and comes back up, notification events may be published for each service that had no available supporting instances (i.e., no backup instances to support the service): (1) one with an event type=instance, to notify that the previously terminated instance is up; and (2) one with an event type=service_member, to notify that the service is up on the previously terminated instance.

Since each of the notification events for the preceding scenario are either an "instance" or "service_member" type, Table 2 shows that all of the properties are included in the event payload. If the database is configured with a database domain, such as us.acme.com, then the domain name qualification is expected to appear for the database and service names in the event property. For example, database=databaseX.us.acme.com and service=serviceY.us.acme.com. In addition, by using the cardinality in response to an UP event, work can be redistributed to use available resources in a balanced manner.

When all the instances that support a service go down, i.e., an entire service is down, then several notification events are published: (1) events are triggered with an event type=service_member for each instance that supports the service, to notify that the service is down on each respective instance; (2) an event is triggered with an event type=service, to notify that the entire service is down; and (3) events are triggered with an event type=instance for each instance that supports the service, to notify that that each respective instance is down. Likewise, when the terminated instances are restarted, then similar events are triggered with an UP status, to notify that the service is up on each respective instance, that the entire service is up, and that the instance are up.

For "service" type events, Table 2 shows that the instance name, node name and cardinality properties can be excluded from the event payload for this type of event. This is because, by definition, a "service" type event means that the entire service is up or down, i.e., the service is up or down on all instances and associated nodes supporting the service, where the supporting instances and nodes for a given service is mapped and available elsewhere. Therefore, the instance, node and cardinality properties are unnecessary for responding to such an event. Similarly, for "database" type events, Table 2 shows that the instance name and node name properties can be excluded from the event payload for this type of event. This is because, by definition, a database type event means that the entire database is up or down, i.e., all instances and nodes in the database are up or down, where the configuration of the database cluster is available elsewhere.

When a node fails, an event with event type=node is triggered, notifying that the node is down. In one embodiment, no other events are triggered, i.e., no service, service_member or instance type events are necessary due to the available mapping of nodes to instances and services. The node event includes the cluster incarnation, thereby facilitating the elimination of duplicate processing of duplicate events. Table 2 shows that the service name, database name, instance name and cardinality properties can be excluded from the event payload for this type of event. If for any reason, a particular node is unable to be restarted, then an event with event type=node and status NOT_RESTARTING is triggered, indicating that intervention is required.

Event Processing

Generally, a given subscriber responds to notification events by identifying one or more sessions that are affected by the system state change and that are associated with the given subscriber, by matching the information in the event payload with session location information that is recorded when a session connection is established. Session location information (i.e., session signature) identifies the location of a session, such as what service, database, instance, node and database are associated with the session. A similar "event" signature is provided as part of the event payload, which can be precisely matched with the signature of one or more sessions that was recorded upon session establishment, to determine the sessions that are affected by the system state change.

The manner in which session location information is recorded may vary from implementation to implementation. For non-limiting examples, session location information may be posted on a "bulletin board" mechanism that is accessible to various subscribers, or the session location information may be stored in an indexed table or a hash table. Detailed actions that various subscribers may perform in response to notification events are beyond the scope of this description.

For example, a connection pool manager is described as one potential subscriber, or client, of notification events that are published in response to state changes to a resource in the cluster. A connection pool manager is a software component that manages connection pools and requests for connections for sessions with server 104 (FIG. 1). Manners in which a connection pool manager may respond to various types of notification events, such as to redistribute connections from connection pools across instances 108a-108n of server 104, are described in detail in U.S. patent application Ser. No. 10/917,663 entitled "Fast Reorganization of Connections In Response To An Event In a Clustered Computing System."

For example, a connection pool manager maintains, for each service, a mapping of connections to physical location, i.e., instances, nodes, databases. Thus, the location of each session, including client-server sessions and batch sessions, are uniquely identified. Whenever a connection is established, the connection pool manager records the location for the connection. These data are used for fast redistribution of the connection pool, whenever a system status change notification event is received. A fast redistribution of the connections in response to events benefits the runtime distribution of work in the cluster by ensuring that the pool has connections that are ready to use when session requests are received.

For other non-limiting examples, (1) in response to server-side callouts, jobs and batch processes can be stopped when a service stops for any reason, and started/restarted immediately when a service starts; (2) callouts can be used for paging and e-mail alerting mechanisms; and (3) callouts can be used for high availability uptime recording, where uptime and downtime can be distinguished, along with the reason for the system change, such as "planned" (e.g., initiated by a user) or "unplanned" (e.g., initiated by a failure).

Implementation Mechanisms

The techniques for fast application notification in a clustered computing system, as described herein, may be implemented in a variety of ways and the invention is not limited to any particular implementation. The approach may be integrated into a system or a device, or may be implemented as a stand-alone mechanism. Furthermore, the approach may be implemented in computer software, hardware, or a combination thereof.

Figure 2:
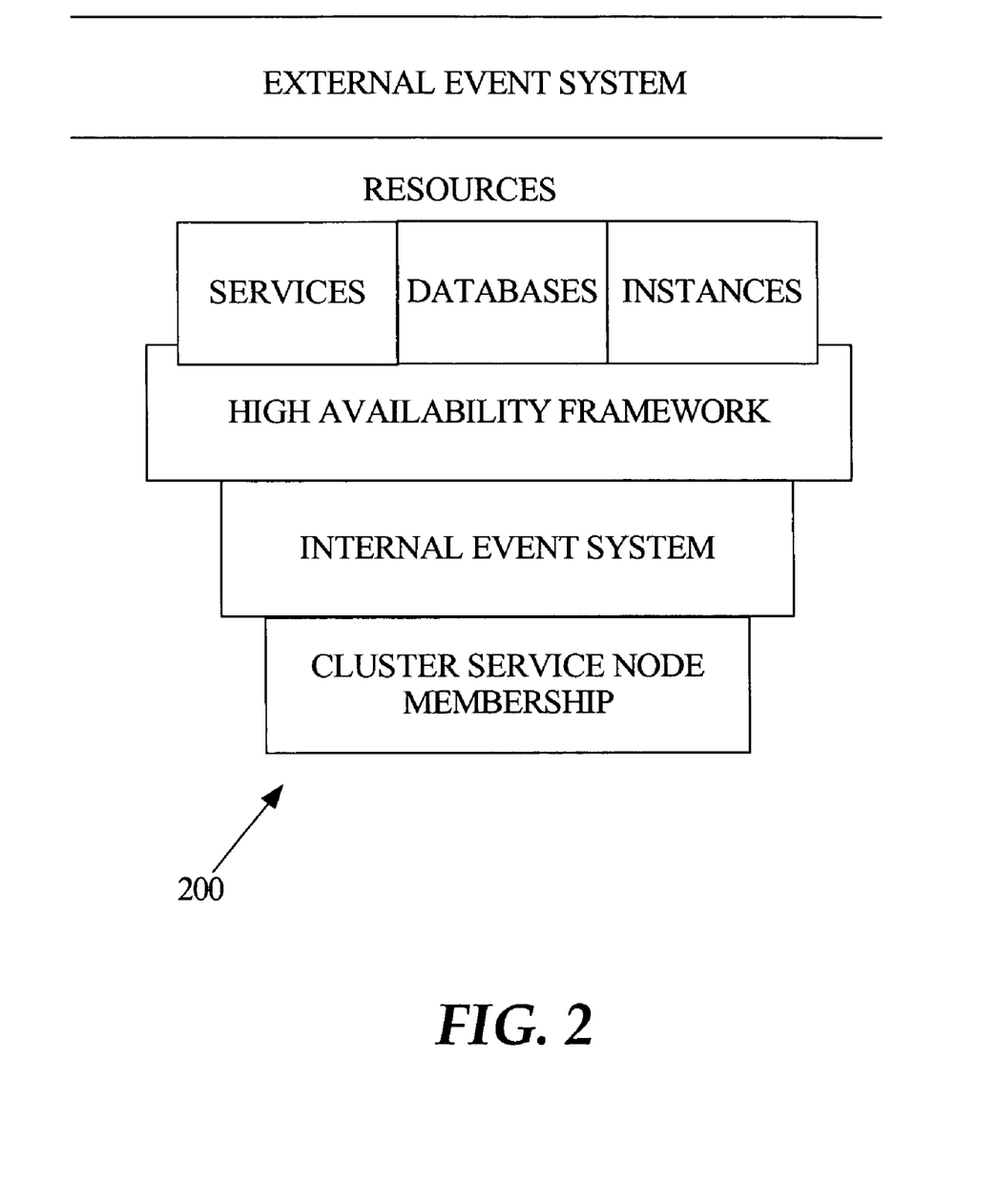
FIG. 2 is a block diagram that generally illustrates a High Availability (HA) system, in which an embodiment of the invention may be implemented.

FIG. 2 is a block diagram that generally illustrates a High Availability (HA) system, in which an embodiment of the invention may be implemented. "Layers" of the illustrated HA system 200 include a Cluster Service Node Membership module; an Internal Event System; an HA Framework, which includes Services, Databases, and Instances; which are communicatively coupled to an External Event System.

HA system 200 executes start and stop actions for resources, i.e., Services, Databases and Instances. The start action posts UP events, and the stop action posts DOWN events. The HA system 200 posts NOT_RESTARTING events when a resource can no longer execute.

Hardware Overview

Figure 3:
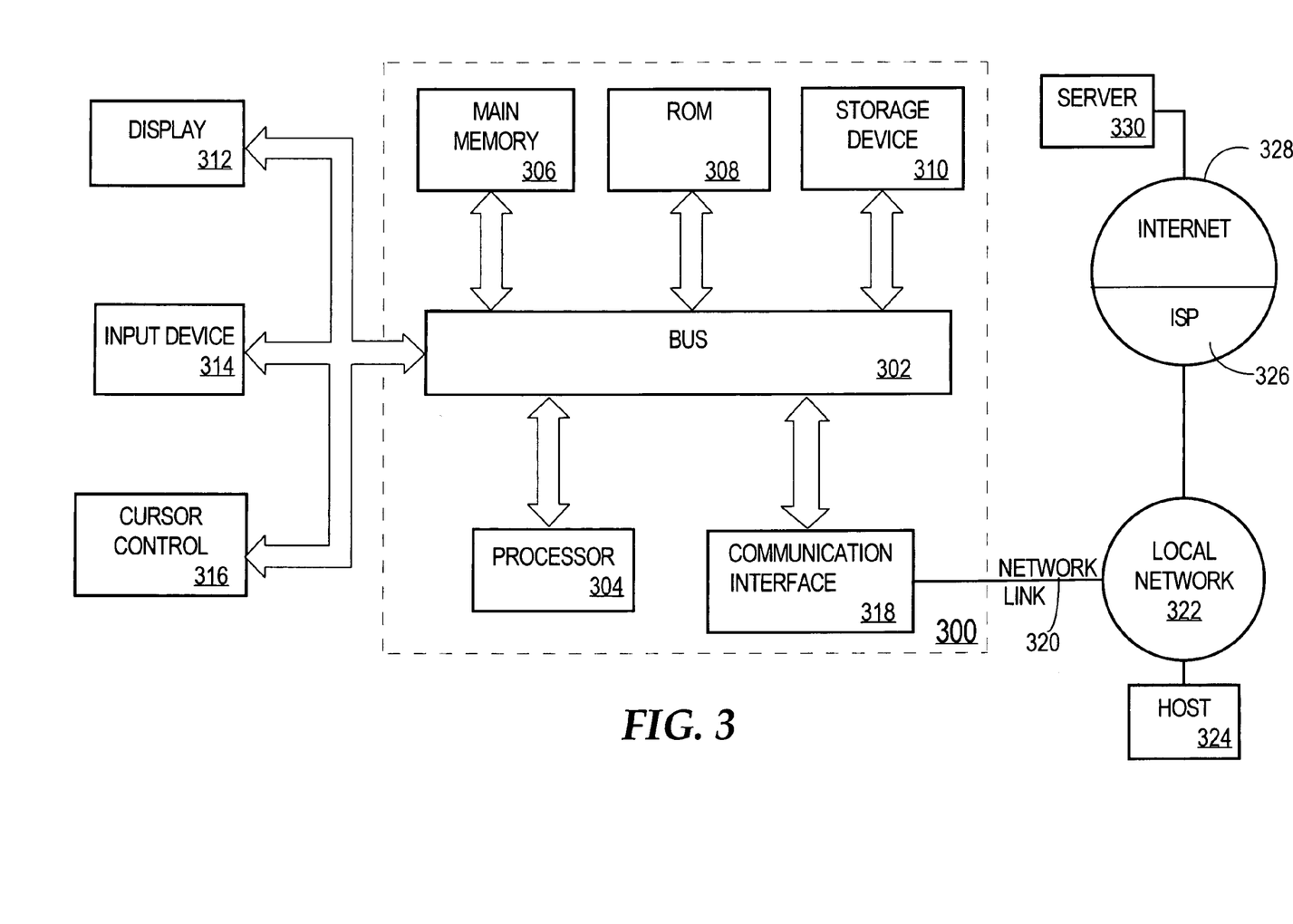
FIG. 3 is a block diagram that depicts a computer system upon which an embodiment of the invention may be implemented.

FIG. 3 is a block diagram that depicts a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, embodiments of the invention are described herein in the context of a server; however, the described techniques are applicable to any clustered computing system over which system connections are allocated or assigned, such as with a system configured as a computing cluster or a computing grid. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for communicating changes about a clustered computing environment that comprises a plurality of interconnected nodes that host clustered server instances, comprising the computer-implemented steps of:
    an application client establishing one or more sessions with a server instance performing work within a cluster, said server instance being one of said clustered server instances;
    wherein said application client resides outside of said cluster;
    wherein said server instance is an allocation of resources of a particular node for performing said work, and said session requests performing said work;
    in response to establishing a session with said server instance, said application client generating session identification information that identifies a resource and a session for which said resource performs work;
    in response to a status change to said resource, generating first data that identifies said resource and second data that indicates a status of said resource;
    publishing said first data and said second data to a set of one or more subscribers, including said application client, wherein said publishing transmits on an out-of-band connection that is different from a connection used by the one or more sessions; and
    in response to receiving said first data and said second data over said out-of-band connection, said application client using said first data, said second data, and said session identification information to identify one or more sessions affected by said status change;
    wherein the steps are performed by a plurality of computers.

2. The method of claim 1, wherein said status of said resource that is identified in said second data is one from a group consisting of (a) termination of said resource, (b) starting of said resource, and (c) unable to restart said resource.

3. The method of claim 1, wherein said cluster is a database cluster, and wherein said resource is identified in said first data by identifying said database cluster that is affected by said status change.

4. The method of claim 3, wherein said work is associated with a service, and wherein said resource is further identified in said first data by identifying said service that is affected by said status change.

5. The method of claim 4, wherein a location of said resource is further identified in said first data by identifying an instance and a node that are affected by said status change.

6. The method of claim 3, further comprising the computer-implemented step of:
    identifying one or more sessions with said database cluster that are affected by said status change, based on matching said session identification information with said first data.

7. The method of claim 6, further comprising the computer-implemented step of:
    interrupting said one or more sessions.

8. The method of claim 1, wherein said resource is identified in said first data by identifying a node that is affected by said status change.

9. The method of claim 1, wherein said work is associated with a service, and wherein said resource is identified in said first data by identifying that said service has terminated at a particular instance and by identifying said particular instance at which said service has terminated.

10. The method of claim 1, wherein said work is associated with a service, and wherein said resource is identified in said first data by identifying that an entire service has terminated and by identifying said service that has terminated.

11. The method of claim 1, wherein said resource is identified in said first data by identifying that a particular instance has terminated and by identifying said particular instance that has terminated.

12. The method of claim 1, wherein said resource is identified in said first data by identifying that all said instances have terminated and that identifies said cluster with which said instances are associated.

13. The method of claim 1, wherein said work is associated with a service, and wherein said resource is identified in said first data by identifying that said service has started at a particular instance and by identifying said particular instance on which said service has started.

14. The method of claim 13, wherein said resource is identified in said first data by identifying a number of instances that support said service that has started.

15. The method of claim 1, wherein said work is associated with a service, and wherein said resource is identified in said first data by identifying that said service has started on any instance and by identifying said service that has started.

16. The method of claim 15, wherein said resource is identified in said first data by identifying a number of instances that support said service that has started.

17. The method of claim 1, wherein said resource is identified in said first data by identifying that a particular instance has started and by identifying said particular instance that has started.

18. The method of claim 1, wherein said resource is identified in said first data by identifying that an instance has started and by identifying said cluster with which said instance is associated.

19. The method of claim 1, wherein said resource is identified in said first data by identifying that a node has terminated and by identifying said node that has terminated.

20. The method of claim 1, wherein the publishing comprises publishing said first data and said second data through processes that are not part of clusterware that manages said cluster.

21. The method of claim 1, wherein a subscriber of the set of one or more subscribers to said first data and said second data is a connection pool manager that responds to said status change by redistributing, based on said first data and said second data, connections to said cluster.

22. The method of claim 1, wherein a subscriber of the set of one or more subscribers to said first data and said second data is a client application that responds to said status change by requesting, based on said first data and said second data, redistribution within said cluster of said work that is affected by said status change.

23. The method of claim 1, wherein a subscriber of the set of one or more subscribers to said first data and said second data is a batch job that responds to said first data and said second data by calling for execution of a routine within said cluster based on said status change.

24. The method of claim 1, wherein said work is associated with a service, and wherein said resource is identified in said first data by identifying that said service is not restarting so that subscribing applications are interrupted from retrying to use said service.

25. A computer-readable volatile or non-volatile storage medium storing one or more sequences of instructions which, when executed by one or more processors, causes the one or more processors to perform:
   an application client establishing one or more sessions with a server instance performing work within a cluster, said server instance being one of said clustered server instances;
   wherein said application client resides outside of said cluster;
   wherein said server instance is an allocation of resources of a particular node for performing said work, and said session requests performing said work;
   in response to establishing a session with said server instance, said application client generating session identification information that identifies a resource and a session for which said resource performs work;
   in response to a status change to said resource, generating first data that identifies said resource and second data that indicates a status of said resource;
   a processor publishing said first data and said second data to a set of one or more subscribers, including said application client, wherein said publishing transmits on an out-of-band connection that is different from a connection used by the one or more sessions; and
   in response to receiving said first data and said second data over said out-of-band connection, said application client using said first data, said second data, and said session identification information to identify one or more sessions affected by said status change.

26. The computer-readable volatile or non-volatile storage medium of claim 25, wherein
   said status of said resource that is identified in said second data is one from a group consisting of (a) termination of said resource, (b) starting of said resource, and (c) unable to restart said resource.

27. The computer-readable volatile or non-volatile storage medium of claim 25,
   wherein said cluster is a database cluster, and wherein said resource is identified in said first data by identifying said database cluster that is affected by said status change.

28. The computer-readable volatile or non-volatile storage medium of claim 27,
   wherein said work is associated with a service, and wherein said resource is further identified in said first data by identifying said service that is affected by said status change.

29. The computer-readable volatile or non-volatile storage medium of claim 28,
   wherein a location of said resource is further identified in said first data by identifying an instance and a node that are affected by said status change.

30. The computer-readable volatile or non-volatile storage medium of claim 27,
   the instructions further comprising instructions that cause the one or more processor to perform:
      identifying one or more sessions with said database cluster that are affected by said status change, based on matching said session identification information with said first data, wherein said session identification information is associated with said session and said first data identifies said resource.

31. The computer-readable volatile or non-volatile storage medium of claim 30,
   further comprising instructions which cause the one or more processors to perform:
      interrupting said one or more sessions.

32. The computer-readable volatile or non-volatile storage medium of claim 25,
   wherein said resource is identified in said first data by identifying a node that is affected by said status change.

33. The computer-readable volatile or non-volatile storage medium of claim 25,
   wherein said work is associated with a service, and wherein said resource is identified in said first data by identifying that said service has terminated at a particular instance and by identifying said particular instance at which said service has terminated.

34. The computer-readable volatile or non-volatile storage medium of claim 25,
   wherein said work is associated with a service, and wherein said resource is identified in said first data by identifying that an entire service has terminated and by identifying said service that has terminated.

35. The computer-readable volatile or non-volatile storage medium of claim 25,
   wherein said resource is identified in said first data by identifying that a particular instance has terminated and by identifying said particular instance that has terminated.

36. The computer-readable volatile or non-volatile storage medium of claim 25,
   wherein said resource is identified in said first data by identifying that all said instances have terminated and that identifies said cluster with which said instances are associated.

37. The computer-readable volatile or non-volatile storage medium of claim 25,
   wherein said work is associated with a service, and wherein said resource is identified in said first data by identifying that said service has started at a particular instance and by identifying said particular instance on which said service has started.

38. The computer-readable volatile or non-volatile storage medium of claim 37, wherein said resource is identified in said first data by identifying a number of instances that support said service that has started.

39. The computer-readable volatile or non-volatile storage medium of claim 25,
wherein said work is associated with a service, and wherein said resource is identified in said first data by identifying that said service has started on any instance and by identifying said service that has started.

40. The computer-readable volatile or non-volatile storage medium of claim 39,
wherein said resource is identified in said first data by identifying a number of instances that support said service that has started.

41. The computer-readable volatile or non-volatile storage medium of claim 25,
wherein said resource is identified in said first data by identifying that a particular instance has started and by identifying said particular instance that has started.

42. The computer-readable volatile or non-volatile storage medium of claim 25,
wherein said resource is identified in said first data by identifying that an instance has started and by identifying said cluster with which said instance is associated.

43. The computer-readable volatile or non-volatile storage medium of claim 25,
wherein said resource is identified in said first data by identifying that a node has terminated and by identifying said node that has terminated.

44. The computer-readable volatile or non-volatile storage medium of claim 25,
wherein publishing comprises publishing said first data and said second data through processes that are not part of clusterware that manages said cluster.

45. The computer-readable volatile or non-volatile storage medium of claim 25,
wherein a subscriber of the set of one or more subscribers to said first data and said second data is a connection pool manager that responds to said status change by redistributing, based on said first data and said second data, connections to said cluster.

46. The computer-readable volatile or non-volatile storage medium of claim 25,
wherein a subscriber of the set of one or more subscribers to said first data and said second data is a client application that responds to said status change by requesting, based on said first data and said second data, redistribution within said cluster of said work that is affected by said status change.

47. The computer-readable volatile or non-volatile storage medium of claim 25,
wherein a subscriber of the set of one or more subscribers to said first data and said second data is a batch job that responds to said first data and said second data by calling for execution of a routine within said cluster based on said status change.

48. The computer-readable volatile or non-volatile storage medium of claim 25,
wherein said work is associated with a service, and wherein said resource is identified in said first data by identifying that said service is not restarting so that subscribing applications are interrupted from retrying to use said service.

* * * * *

UNITED STATES PATENT AND TRADEMARK OFFICE
CERTIFICATE OF CORRECTION

| | | |
|---|---|---|
| PATENT NO. | : 7,747,717 B2 | Page 1 of 1 |
| APPLICATION NO. | : 10/917660 | |
| DATED | : June 29, 2010 | |
| INVENTOR(S) | : Carol Colrain | |

It is certified that error appears in the above-identified patent and that said Letters Patent is hereby corrected as shown below:

In column 15, line 4, in claim 20, after "wherein" delete "the".

Signed and Sealed this
Nineteenth Day of April, 2011

David J. Kappos
*Director of the United States Patent and Trademark Office*